(12) United States Patent
Sharrah et al.

(10) Patent No.: US 11,060,656 B2
(45) Date of Patent: Jul. 13, 2021

(54) PORTABLE LIGHTING DEVICE

(71) Applicant: Streamlight, Inc., Eagleville, PA (US)

(72) Inventors: Jonathan R. Sharrah, Phoenixville, PA (US); Matthew B. Dalton, Elkins Park, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 16/251,400

(22) Filed: Jan. 18, 2019

(65) Prior Publication Data

US 2020/0232597 A1 Jul. 23, 2020

(51) Int. Cl.
*F21V 21/06* (2006.01)
*F16M 11/24* (2006.01)
*F21V 21/40* (2006.01)
*F21W 131/10* (2006.01)

(52) U.S. Cl.
CPC ............. *F16M 11/24* (2013.01); *F21V 21/06* (2013.01); *F21V 21/406* (2013.01); *F21W 2131/1005* (2013.01)

(58) Field of Classification Search
CPC ........ F16M 11/24; F21V 21/406; F21V 21/06
See application file for complete search history.

(56) References Cited

U.S. PATENT DOCUMENTS

| 6,120,164 | A | * | 9/2000 | Libin ................ F21V 21/30 362/227 |
| 6,164,801 | A | | 12/2000 | Alexander-Katz |
| 9,816,661 | B2 | | 11/2017 | Sharrah et al. |
| 9,967,920 | B2 | * | 5/2018 | Itoh ................... H05B 1/0288 |
| D866,028 | S | * | 11/2019 | Czarnik ..................... D26/37 |

| 2013/0343043 | A1 | | 12/2013 | Yu |
| 2014/0313706 | A1 | * | 10/2014 | Itoh ................ F21V 21/14 362/184 |
| 2016/0327260 | A1 | | 11/2016 | Chaimberg |

FOREIGN PATENT DOCUMENTS

DE 202018101913 U1 4/2018
JP 2014212023 A 11/2014

OTHER PUBLICATIONS

DeWalt DC012 Worksite Radio [Online], [Retrieved on Jul. 23, 2018], Retrieved from the internet: <https://www.amazon.com/DEWALT-DC012-7-2-Volt-18-Volt-Heavy-Duty-Worksite/dp/B002S56S5Q/ref=sr_1_3?s=hi&ie=UTF8&qid=1539279211&sr=1-3&keywords=dewalt+jobsite+radio>.
Bosch PB360C Jobsite Stereo [Online], [Retrieved on Jul. 23, 2018], Retrieved from the internet: <https://www.amazon.com/Bosch-Bluetooth-Jobsite-Charger-PB360C/dp/B015XPRYS2/ref=sr_1_11?s=hi&ie=UTF8&qid=1539279782&sr=1-11&keywords=dewalt+jobsite+radio>.
Revel Scout Portable Emergency Scene Light—Standard Package [Online], [Retrieved on Jul. 23, 2018], Retrieved from the internet: <https://www.akronbrass.com/revel-scout-scene-light-one-battery?__SID=U>.
Milwaukee 49-24-0280 28 Volt Lithium-Ion Job Site Radio [Online], [Retrieved on Jul. 23, 2018], Retrieved from the internet: www.amazon.com [currently unavailable].
Pelican 9490 Remote Area Light [Online], [Retrieved on Jul. 23, 2018], Retrieved from the internet: <https://www.pelican.com/us/en/product/remote-area-lights/9490>.
International Search Report and Written Opinion of the International Searching Authority from corresponding PCT Application No. PCT/2020/013806, dated May 29, 2020 (11 pages).

* cited by examiner

*Primary Examiner* — Karabi Guharay
(74) *Attorney, Agent, or Firm* — Quarles & Brady LLP; James J. Aquilina (57) ABSTRACT

A portable scene light capable of multiple configurations is disclosed.

22 Claims, 8 Drawing Sheets

PORTABLE LIGHTING DEVICE

FIELD OF THE DISCLOSURE

The present disclosure relates to the field of portable lighting devices, and more particularly to a portable lighting device for use as a "scene" light at, for example, worksites and emergency scenes.

BACKGROUND

Portable scene lights having variable light output intensity and positional adjustability are known in the art. One example of a portable scene light is the "Portable Scene Light" manufactured by Streamlight, Inc. of Eagleville, Pa., U.S.A., which is the applicant of the present application.

Known portable scene lights lack the ability to be stacked for storage or to create a vertical "light tower" at scenes in which such a light array is useful or desirable. Many known portable lighting devices also lack a countdown display that communicates remaining battery life to the user.

Accordingly, there is a need for improved portable lighting devices that overcome these and other drawbacks of the prior art devices.

BRIEF DESCRIPTION OF THE DRAWINGS

The lighting device according to the present disclosure is further described with reference to the accompanying drawings, in which.

SUMMARY OF THE INVENTIVE CONCEPTS

In one respect, the inventive concept is a lighting device comprising at least one light and a frame, the at least one light attached to the frame, the frame comprising a first bar portion and a second bar portion that comprise the top edges of the frame, the top edges of the frame lying in a first plane, a plurality of bottom edges, the plurality of bottom edges lying in a second plane, the first plane and the second plane being approximately parallel; a first planar portion, the first planar portion being vertically aligned below the first bar portion between the first plane and the second plane, the first planar portion being oriented approximately parallel to the first bar portion and the first plane and lying in a third plane that is approximately parallel to the first plane; and a second planar portion, the second planar portion being vertically aligned below the second bar portion between the first plane and the second plane, the second planar portion being oriented approximately parallel to the second bar portion and the first plane and lying in the third plane.

In another respect, the inventive concept is a lighting device comprising at least one light that is capable of being selectively aimed in a first direction and a second direction that is opposite the first direction; and a frame, the at least one light attached to the frame, the frame including a first bar portion and a second bar portion, the first bar portion and the second bar portion being located at a top portion of the frame located above the at least one light, a continuous frame portion that extends from both of the first bar portion and the second bar portion towards a first side of the frame that corresponds with the first direction of the at least one light, at least a portion of the continuous frame portion extending below the at least one light, a first frame portion extending from the first bar portion towards a second side of the frame that corresponds with the second direction of the at least one light, at least a portion of the first frame portion extending below the at least one light, the first frame portion having no additional connection with any other portion of the frame, and a second frame portion extending from the second bar portion towards the second side of the frame, at least a portion of the second frame portion extending below the at least one light, the second frame portion having no additional connection with any other portion of the frame.

In yet another respect, the inventive concept is an apparatus comprising a first unit and a second unit of a lighting device, the first and second units each having at least one light including a respective rotational range about a respective axis of rotation, the first and second units being stackable with the first unit located on top of the second unit or the second unit located on top of the first unit such that a light array having an upper unit and a lower unit is formed, each of the first and second units further comprising an identical frame, the frame comprising top edges that lie in a first plane, bottom edges that line in a second plane, the first and second planes being approximately parallel, at least one planar portion lying in a third plane, the third plane being approximately parallel with the first plane, wherein in the light array the first plane of the lower unit is located above the second plane and adjacent to the third plane of the upper unit, and wherein in the light array the at least one light of the upper unit is free to rotate through its entire rotational range and the at least one light of the lower unit is free to rotate through its entire rotational range without the lights contacting each other.

DETAILED DESCRIPTION

The ensuing detailed description provides exemplary embodiment(s) only, and is not intended to limit the scope, applicability, or configuration of the herein disclosed embodiment(s). Rather, the ensuing detailed description of the exemplary embodiment(s) will provide those skilled in the art with an enabling description for implementing the exemplary embodiments in accordance with the present disclosure. It should be understood that various changes may be made in the function and arrangement of elements without departing from the spirit and scope of the invention, as set forth in the appended claims.

To aid in describing the disclosure and/or invention as claimed, directional terms may be used in the specification and claims to describe portions of the present disclosure and/or invention (e.g., upper, lower, left, right, etc.). These directional definitions are merely intended to assist in describing the embodiment(s) and claiming the invention, and are not intended to limit the disclosure or claimed invention in any way. In addition, reference numerals that are introduced in the specification in association with a drawing figure may be repeated in one or more subsequent figures without additional description in the specification, in order to provide context for other features.

It should be understood that when an element is referred to as being "connected" or "coupled" to another element, it can be integral with the other element, directly connected or coupled to the other element, or that intervening elements may be present. In contrast, when an element is referred to as being "directly connected" or "directly coupled" to another element, it should be understood that no intervening elements are present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments, unless noted to the contrary.

For purposes of the attached specification and claims, the term "approximately parallel" means within a range of plus or minus 5 degrees from parallel, inclusive of an exact parallel arrangement.

For purposes of the attached specification and claims, the term "approximately perpendicular" means within a range of plus or minus 5 degrees from perpendicular, inclusive of an exact perpendicular arrangement.

In applications in which it is desirable or necessary to illuminate a scene, for example a work or accident scene, a portable light that is capable of multiple free-standing or mounted positions may be an effective tool. It is the desire of Applicant to disclose a portable scene light that incorporates several improvements over the prior art.

Referring now generally to FIGS. 1-8, one embodiment of a portable lighting device in the form of a scene light 14 according to the present disclosure will be described in detail. In this embodiment, the light 14 comprises a light head 16 that is rotatably attached to a frame 40 about an axis of rotation 18. The light head 16 comprises a body 26, a front cover 23 that supports a lens 22 and that is fixedly attached to one side of the body 26 via multiple fasteners (for ease of illustration, only a single fastener 24 is labeled in the Figures), and a rear cover 30 that is fixedly attached to an opposite side of the body 26 via multiple fasteners (for ease of illustration, only a single fastener 31 is labeled in the Figures). In this embodiment, a light-emitting portion (e.g., one or more lamps) is located behind the lens 22 and can be illuminated via operation of a switch 34 that extends through the rear cover 30.

Figure 1:
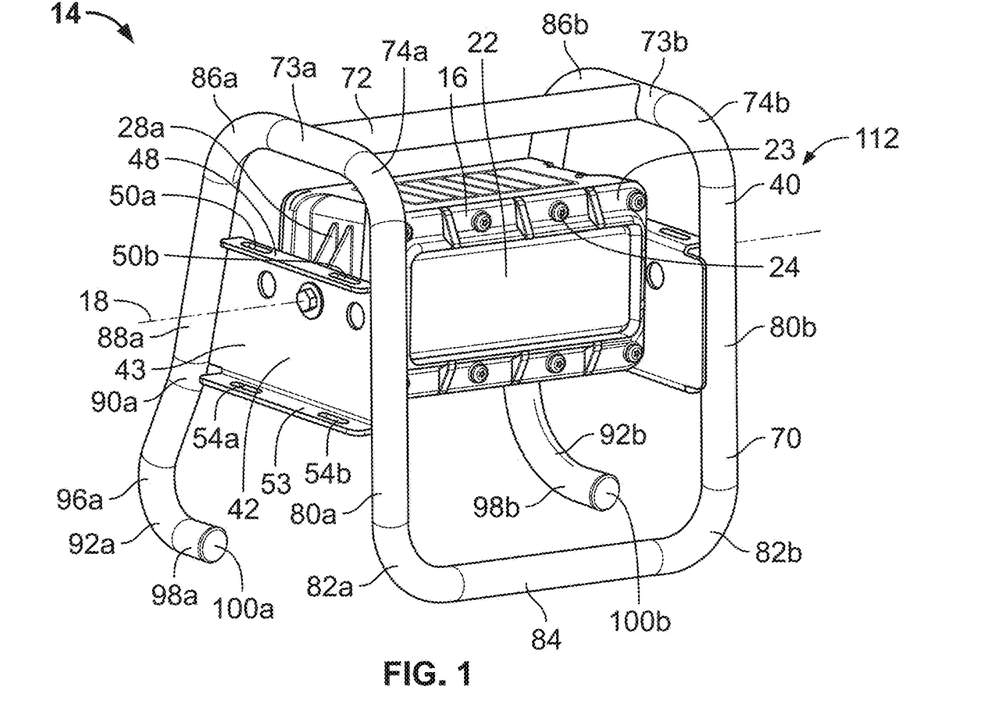
FIG. 1 is a front perspective view of an embodiment of a portable lighting device according to the present disclosure.
Figure 2:
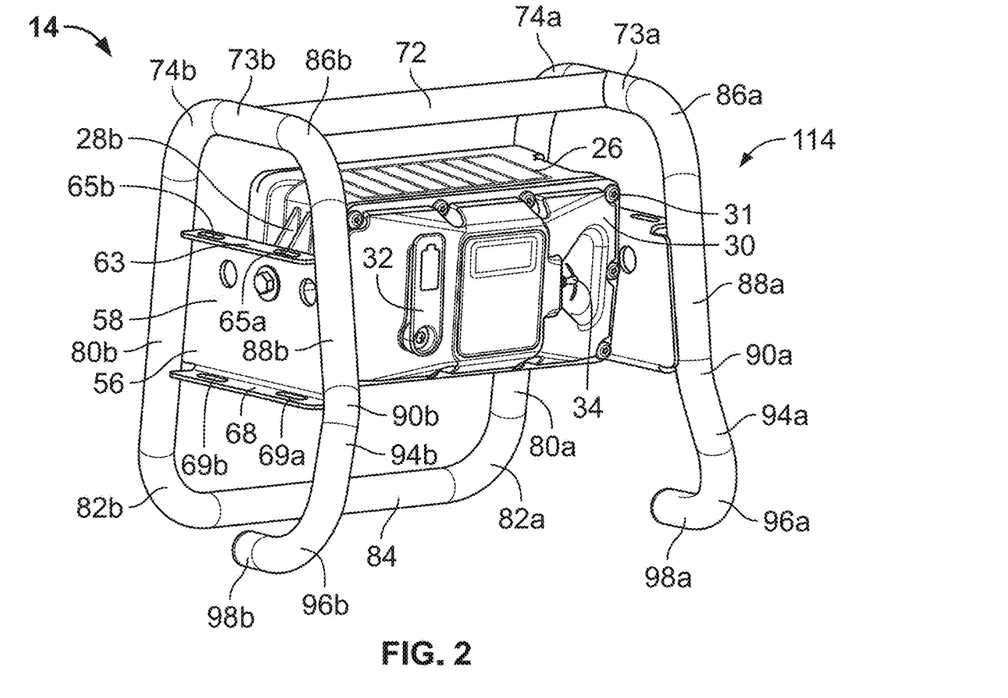
FIG. 2 is a rear perspective view thereof.
Figure 3:
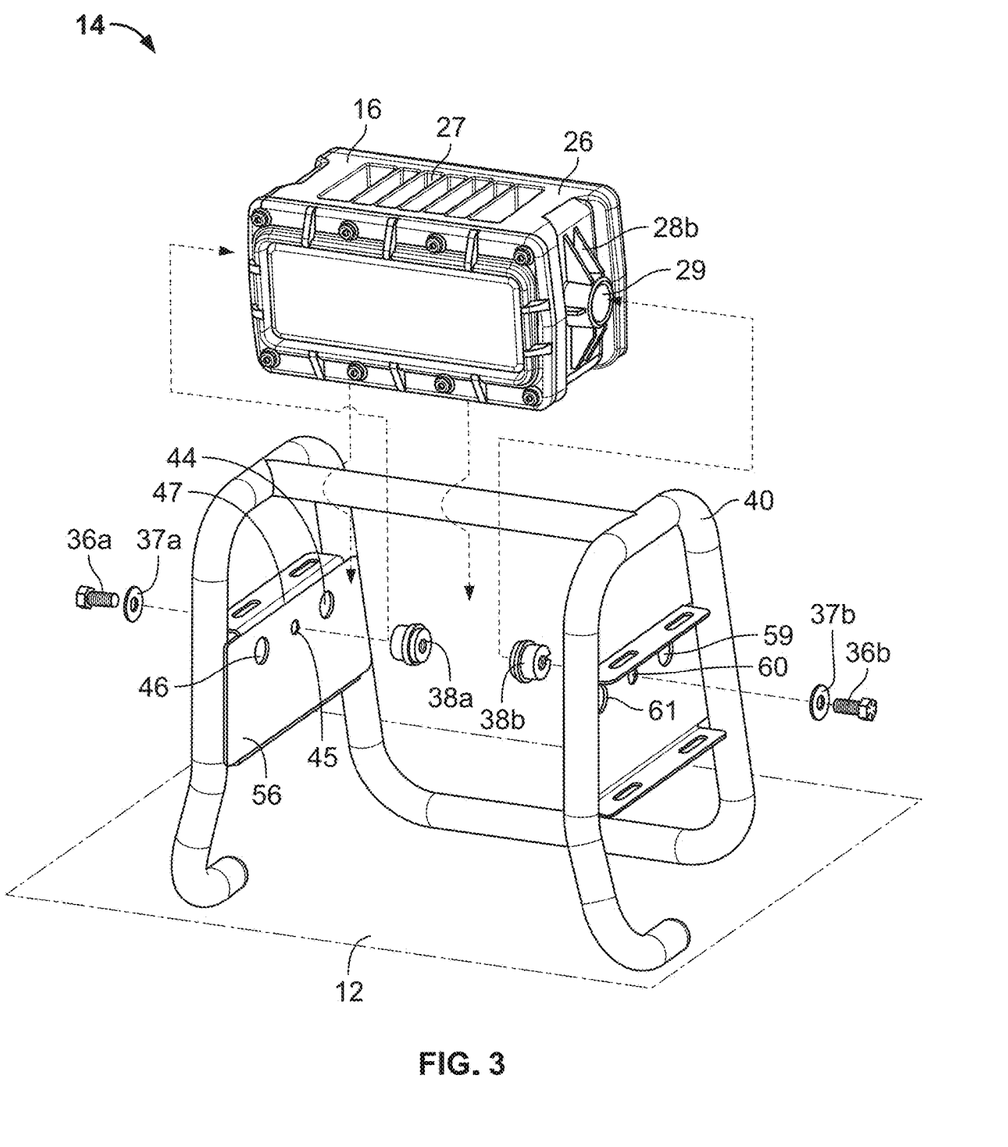
FIG. 3 is a partial exploded view thereof.

In this embodiment, the light head 16 includes multiple vents (for ease of illustration, only one vent 27 is labeled) that allow airflow to and from the body 26 thereof. The body 26 of the light head 16 also includes mounts 28a,28b located on either side thereof, each mount containing a respective hole (only hole 29 is shown and labeled in the Figures) that are each sized to receive a respective insert 38a,38b therein.

Each of the inserts 38a,38b includes internal threading (not labeled) such that a respective fastener 36a,36b and washer 37a,37b combination can be used to rotatably attach the light head 16 to the frame 40.

In this embodiment, the rear cover 30 of the light head 16 further includes a cover 32 that removably conceals a battery compartment and/or charge port. In this embodiment, the light head 16 is capable of variable light output intensities and a countdown display for remaining available runtime (based on battery charge capacity). The internal parts, assembly, and functionality of the light head 16 are otherwise outside the scope of the present specification, and will not be described further. Further, it should be understood that the light 14 of the present disclosure is modular in that the light head 16 may be removed and replaced with a different light head, for example one having different settings or options, as desired or necessary based on the user's needs.

In the present embodiment, the frame 40 of the light 14 is comprised of pieces of steel of circular cross-sectional shape (i.e., tubular steel) that have been bent and welded together as necessary. In alternate embodiments, the frame 40 could be assembled from multiple pieces of material that are attached together via a different means (e.g., suitable fasteners), could be comprised of units of material of different cross-sectional shape (e.g., square, oval, triangular, hexagonal, and/or octagonal), and/or could be comprised of different materials (e.g., other types of metals, plastics, wood, and/or composite materials). In this embodiment, the frame 40 is comprised of a main portion 70 and side plates 42,56 that have been welded to the main portion 70.

Side plate 42 comprises a portion 43 that includes holes 44,45,46, a portion 48 that is attached to the portion 43 by a bend 47, and a portion 53 that is attached to the portion 43 by a bend 52. In this embodiment, the side plate 42 is comprised of a single piece of material, and each of the bends 47,52 orients the respective portion 48,52 orthogonally to the portion 43. In alternate embodiments, the side plate 42 could be comprised of more than one piece of material and/or either or both of the portions 48,52 could be oriented at a non-orthogonal relationship with respect to the portion 43. In the present embodiment, portion 48 includes two slots 50a,50b and portion 52 includes two slots 54a,54h. In alternate embodiments, one or more of the slots 50a,50b, 54a,54b could be omitted from the portions 48,52, or a greater or lesser number of slots could be provided in each of the portions 48,52.

Side plate 56 comprises a portion 58 that includes holes 59,60,61, a portion 63 that is attached to the portion 58 by a bend 62, and a portion 68 that is attached to the portion 58 by a bend 67. In this embodiment, the side plate 56 is comprised of a single piece of material, and each of the bends 62,67 orients the respective portion 63,68 orthogonally to the portion 58. In alternate embodiments, the side plate 56 could be comprised of more than one piece of material and/or either or both of the portions 63,68 could be oriented at a non-orthogonal relationship with respect to the portion 58. In the present embodiment, portion 63 includes two slots 65a,65b and portion 68 includes two slots 69a,69b. In alternate embodiments, one or more of the slots 65a,65b, 69a,69b could be omitted from the portions 63,68, or a greater or lesser number of slots could be provided in each of the portions 63,68.

In this embodiment, fastener 36a is routed through hole 45 in side plate 42 and fastener 36b is routed through hole 60 in side plate 56 in order to attach the light head 16 to the frame 40. In this embodiment, the light head 16 may be freely rotated through a complete 360 degree range in either rotation direction 20 (see FIG. 6). In alternate embodiments, one or more rotation stops, detents, or other mechanical means may be used to limit the rotational range of the light head 16.

Turning back to the present embodiment, the main portion 70 of the frame 40 is comprised of two lengths of material, one that is used as a cross-bar 72 located at the top of the frame 40 (and which also doubles as a carrying handle), and a second, larger length that is bent repeatedly to form the remainder of the main portion 70 of the frame 40. In alternate embodiments, the main portion 70 could be formed from a single piece of material or more than two pieces of material.

The structure and geometry of the frame 40 will now be described in detail. In this embodiment, two bar portions 73a,73b are oriented orthogonally to the cross-bar 72 and welded thereto. At the front side of the frame 40, bar portion 73a meets a bend 74a which meets a leg 80a at its opposite end, and bar portion 73b meets a bend 74b which meets a leg 80b at its opposite end. The bends 74a,74b—as measured between the respective bar portion 73a,73b and the respective leg 80a,80b—have an internal angle 76 (see FIG. 7). In this embodiment, angle 76 has an obtuse value of approximately 97.5 degrees. Each of the two legs 80a,80b meets a respective bend 82a,82b that are each angled inwardly towards another, and a cross portion 84 that is located at the bottom front of the frame 40 attaching the two bends 82a,82b together. In this way, the combination of the legs 80a,80b, bends 82a,82b, and cross portion 84 form a continuous frame portion of approximately "U"-shape located at the front of the frame 40. In alternate embodiments, the angle 76 may have any obtuse value between 90 and 120 degrees, or more preferably between 92.5-105 degrees.

Referring back to the present embodiment, at the rear side of the frame 40, bar portion 73a meets a bend 86a which meets a leg 88a at its opposite end, and bar portion 73b meets a bend 86b which meets a leg 88b at its opposite end. The bends 86a,86b—as measured between the respective bar portion 73a,73b and the respective leg 88a,88b—have an internal angle 78 (see FIG. 7). In this embodiment, angle 78 has an obtuse value of approximately 97.5 degrees. In alternate embodiments, the angle 78 may have any obtuse value between 90 and 120 degrees, or more preferably between 92.5-105 degrees. Referring back to the present embodiment, each of the two legs 88a,88b meet a respective bend 90a,90b that angle outwardly (i.e., away from each other and away from the location of the light head 16) and then meet respective bar portions 94a,94b, which are linear. Each of these bends 90a,90b has a respective angle 89a,89b—as measured between a respective one of the legs 88a,88b and a respective one of the bar portions 94a,94b (see FIG. 8)—that has a value of approximately 165 degrees. In alternate embodiments, each of the angles 89a,89b may have any value between 150 and 180 degrees (exclusive of a linear 180 degree arrangement), more preferably between 155-175 degrees, and most preferably between 160-170 degrees.

Referring back to the present embodiment, the bar portions 94a,94b each meet a respective hooked leg 92a,92b, each of which comprises a respective bend 96a,96b and a respective bar portion 98a,98b, which are linear. In this embodiment, because the frame 40 is comprised of tubular steel, the bar portions 98a,98b have openings (not shown or labeled) at their ends, which in this embodiment are each covered by a respective cap 100a,100b that has been press-fit therein. In alternate embodiments, the caps 100a,100b could be omitted or provided with a textured or tacky surface that help keep the light 14 in place once installed on some items or surfaces. The bends 96a,96b—as measured between the respective bar portion 94a,94b and the respective bar portion 98a,98b—each have an angle 91 (see FIG. 7). In this embodiment, angle 91 has an acute value of approximately 85 degrees. In alternate embodiments, the angle 91 may have any acute value between 60 and 90 degrees, more preferably any acute value between 75-90 degrees, and most preferably any acute value between 80-90 degrees.

Figure 6:
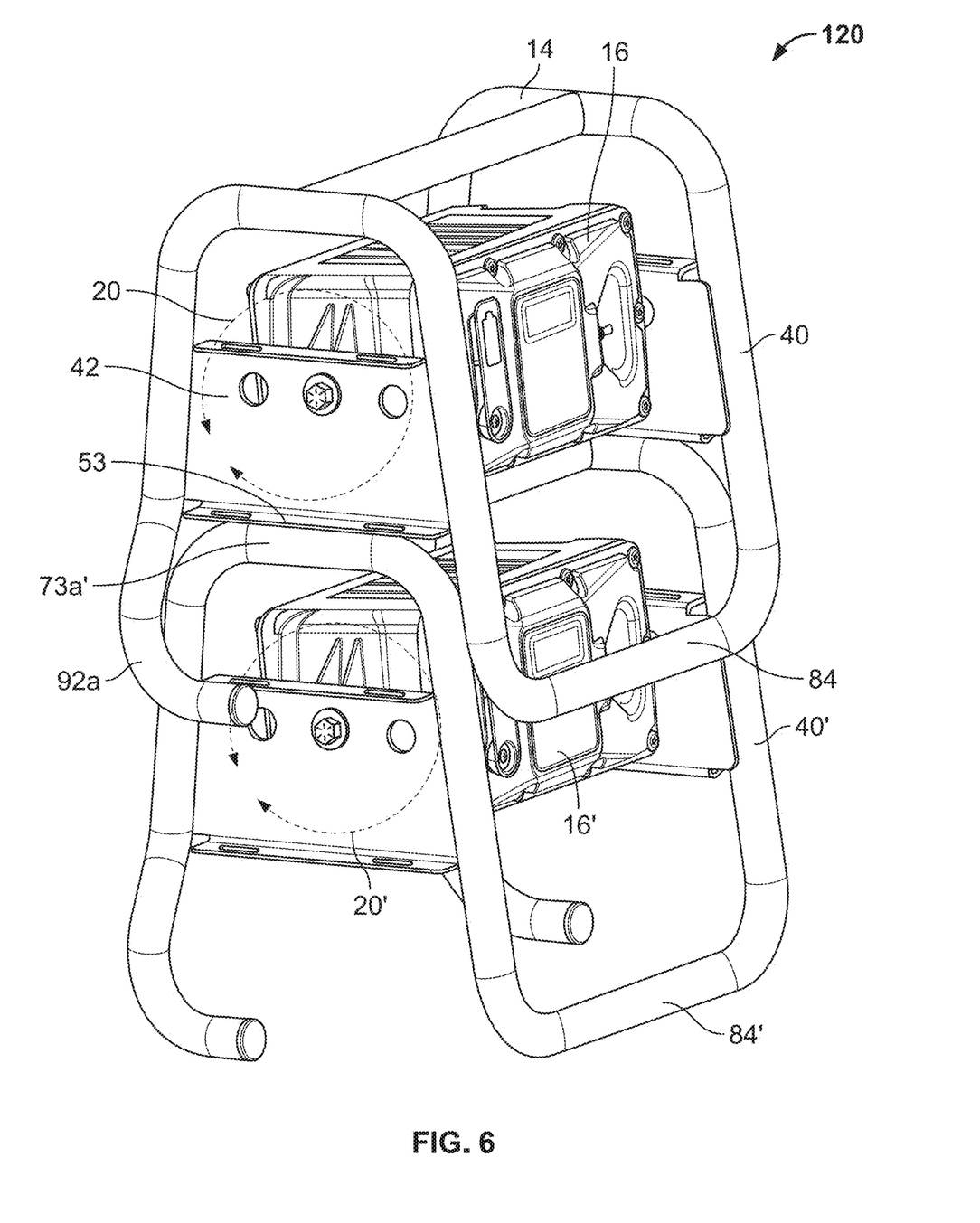
FIG. 6 is a rear perspective view of a light array comprising two individual units of the portable lighting device of FIG. 1 in a stacked configuration.
Figure 7:
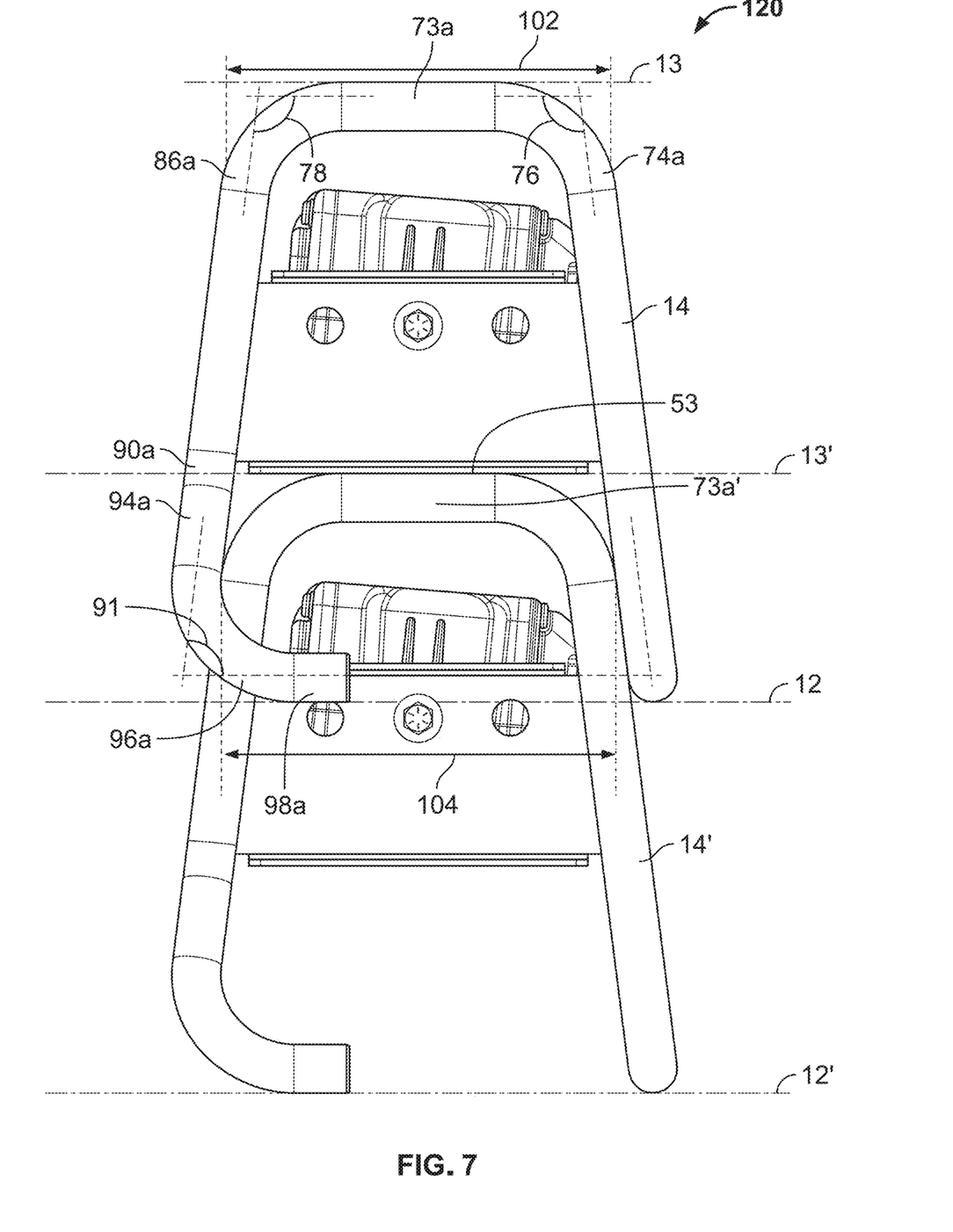
FIG. 7 is a side view thereof.
Figure 8:
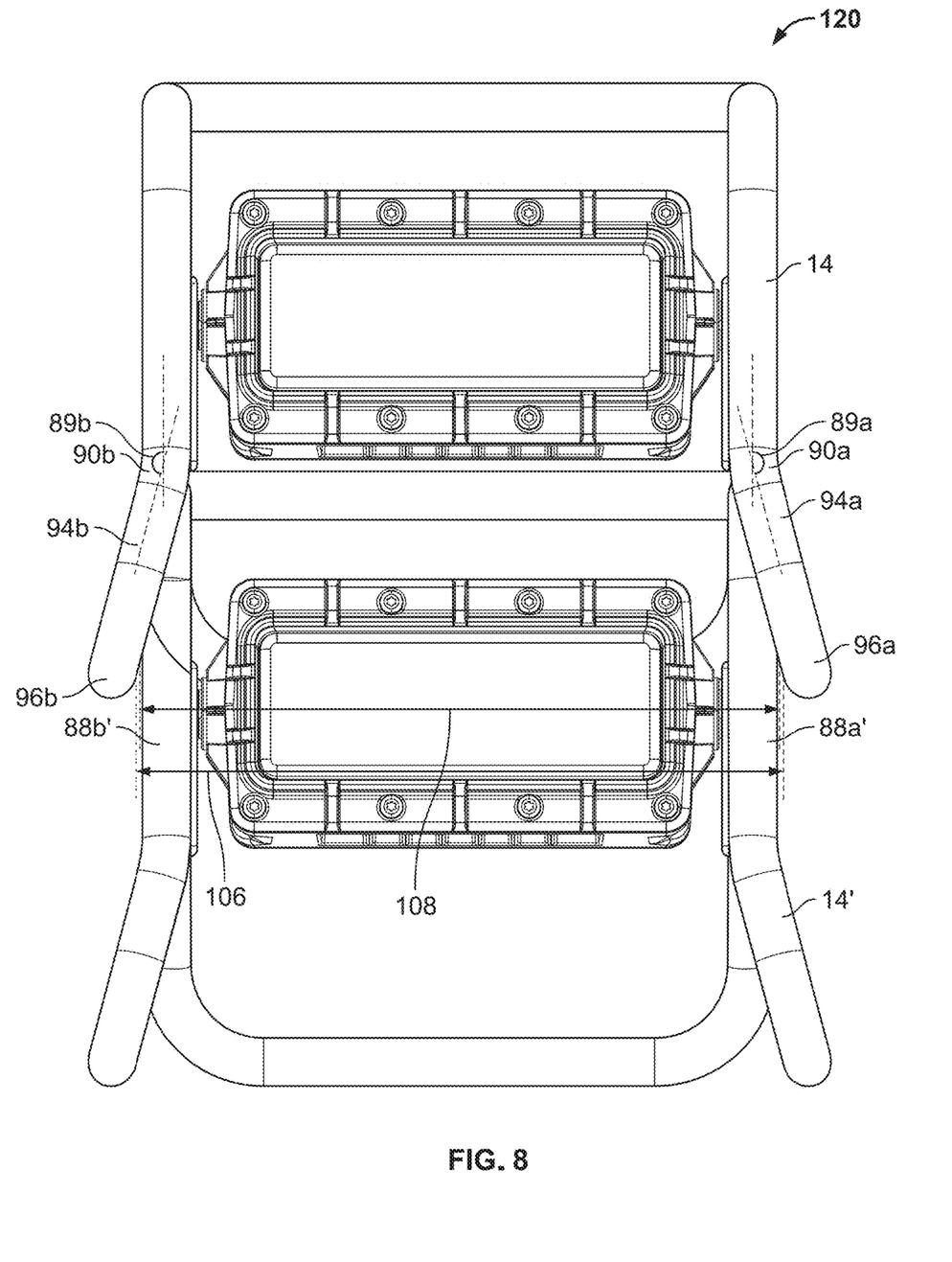
FIG. 8 is a front view thereof.

FIGS. 6-8 show an embodiment of a light array 120 formed by stacking together a plurality of units of the light 14,14'. It should be understood that the light 14' is identical to the light 14 and that all reference numbers appearing in the specification and drawings that refer to one of the units of the light 14,14' refer also to identical parts bearing reference numbers of the same numerical value in the other of the units of the light 14,14', without the need to repeat explanations regarding the structure or functionality of each unit. It should be understood further that any number of units of the light 14 could be stacked together to form a light array in accordance with the present disclosure. In this embodiment, the separate units of the light 14,14' are not secured together in any way, and that the units merely rest atop each other within the light array 120.

As shown in FIG. 7, due to the upper angles 76,78 being obtuse, the frame 40 has a body that tapers in depth (as measured between the front side and rear side of the frame 40) that allows for multiple units of the light 14,14' to be stacked and partially nested together, such that the plane 12 formed by the bottom edges of the frame 40 of a first unit of the light 14 is located lower than the plane 13' formed by the top edges of the frame 40 of a second unit of the light 14' within the light array 120 when the units of the light 14,14' are stacked together. In this embodiment, the value of a depth 102 of the upper portion of the frame 40 (as measured between the exterior edges of the front and rear sides of the frame 40) is slightly less than the value of a depth 104 of the lower portion of the frame 40 (as measured between the interior edges of the front and rear sides of the frame 40) such that the upper portion of one frame (e.g., frame 40' of light 14') can be inserted within the bottom opening of the lower portion of a second frame (e.g., frame 40 of light 14).

As seen in FIGS. 6 and 8, the outwardly-angled bends 90a,90b also locate the hooked legs of the "upper" unit of a light array 120 (e.g., hooked legs 92a,92b of light 14) just to the outside of the rear legs of a "lower" unit of the light array (e.g., legs 88a',88b' of light 14'), such that the value of a width 108 as measured between exterior edges of rear legs of the "lower" light unit (e.g., legs 88a',88b' of light 14') is slightly less than the value of a width 106 as measured between interior edges of the lower leg bends of the "upper" light unit (e.g., bends 96a,96b of light 14). Further, in this embodiment, when stacked together into a light array 120, the bottom portions of the two side plates of the "upper" light (e.g., bottom portions 53,68 of side plates 42,56 of light 14) rest atop respective upper bar portions of the frame of the "lower" light (e.g., bar portions 73a',73b' of the frame 40' of light 40'), with these two bottom portions lying in a plane 55 that is parallel to the planes 12,13 of the bottom edges and upper edges, respectively, of the frame 40. Due to this combination of features—i.e., the tapered depth of the frame, the wrapping of the hooked legs of the upper light unit around the legs of the lower light unit, and the ability for the bottom portions of the side plates of the upper light unit to rest atop the upper bar portions of the frame of the lower light unit in a "shelf-like" manner—multiple units of the light 14 according to the present disclosure can be stacked together to create the light array 120 in a very stable and reliable manner. If desired or necessary, straps, cables, ropes, tie-downs or other securing means (not shown) could be routed between the slots 50*a*,50*b*,54*a*,54*b*,65*a*,65*b*,69*a*, 69*b* and/or holes 44,46,59,61 of the plurality of lights (e.g., lights 14,14') in the light array 120 to further secure the units together.

As noted above, in this embodiment the light heads 16,16' of the lights 14,14' have complete freedom to rotate about their respective axes of rotation 18 so that the individual light heads 16,16' can be selectively aimed to light up a particular scene, as desired by the user. When multiple units of the light 14,14' are stacked together to form a light array 120, the cross portion 84 of the frame 40 of the "upper" light 14 may impede a portion of the light cast by the light head 16' of the "lower" light 14' if the light head 16' is aimed towards that side of its frame 40'. If this is an issue for the user, the light head 16' (or all light heads 16,16' in the light array 120) can be rotated towards the opposite side of the frames 40,40' of the light array 120, where there is no cross-member that might impede the light emitted by any of the light heads 16,16'.

Figure 4:
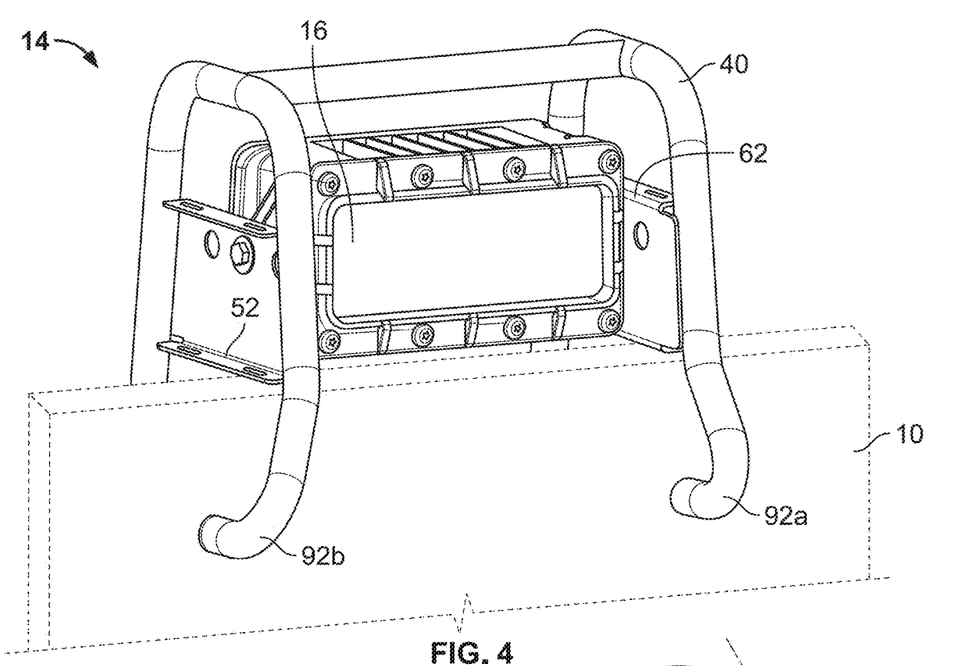
FIG. 4 is a front perspective view thereof, showing the portable lighting device supported from an exemplary item.
Figure 5:
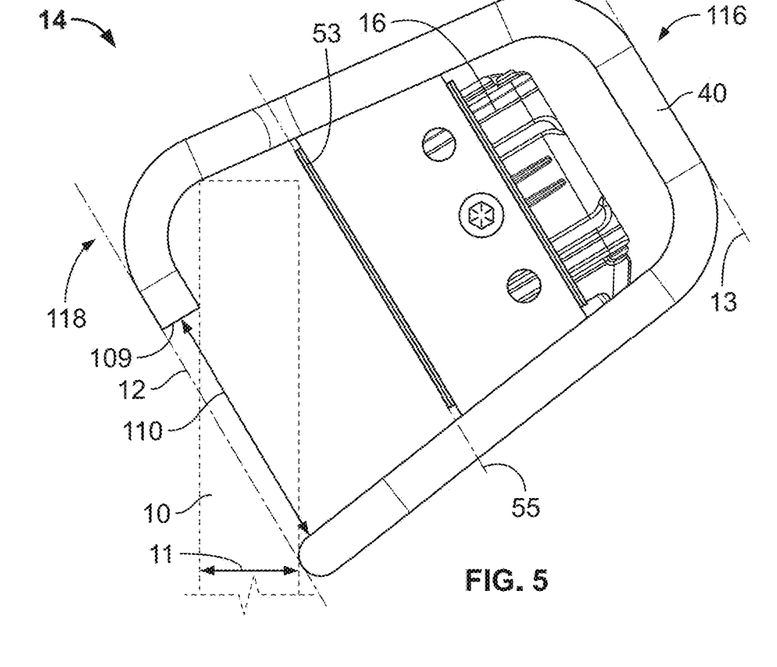
FIG. 5 is a side view thereof.

Referring back to FIGS. 4 and 5, the light 14 also includes a gap 109 having a depth 110 that is formed between the ends of the hooked legs 82*a*,82*b* and the interior surface of the bends 82*a*,82*b* and cross portion 84. The gap 109 permits an exterior item (e.g., a mounting item 10 such as a door having a width 11 having a value that is less than the value of the depth 110 of the gap 109) to be inserted at least partially within the gap 109 so that the light 14 can be temporarily mounted from the item 10. FIG. 4 shows a mounting arrangement with respect to the item 10 in which the frame 40 of the light 14 is arranged relatively parallel with the upper surface of the item 10, and FIG. 5 shows a mounting arrangement with respect to the item 10 in which the frame 40 is angled at a downwardly-facing oblique angle with respect to the item 10. The opposing "closed loop" and hooked legs 82*a*,82*b* of the frame 40 allow the user a multitude of mounting options depending on the nature of the item 10, and the complete rotational freedom of the light head 16 permits the light head 16 to be reoriented for effective use regardless of the mounting angle of the frame 40 with respect to the item 10.

In one respect, the frame 40 can be described as having a front side 112 and a rear side 114 as measured through a plane (not shown) located vertically about the axis of rotation 18 of the light head 16 (i.e., approximately bisecting the cross-bar 72 and the light head 16, without cutting through the front cover 23 or rear cover 30). The frame 40 can also be described as having a top side 116 and a bottom side 118 as measured through a plane (not shown) located horizontally about the axis of rotation 18 of the light head 16 (i.e., approximately bisecting the light head 16 and the legs 80*a*,80*b*).

Figure 9:
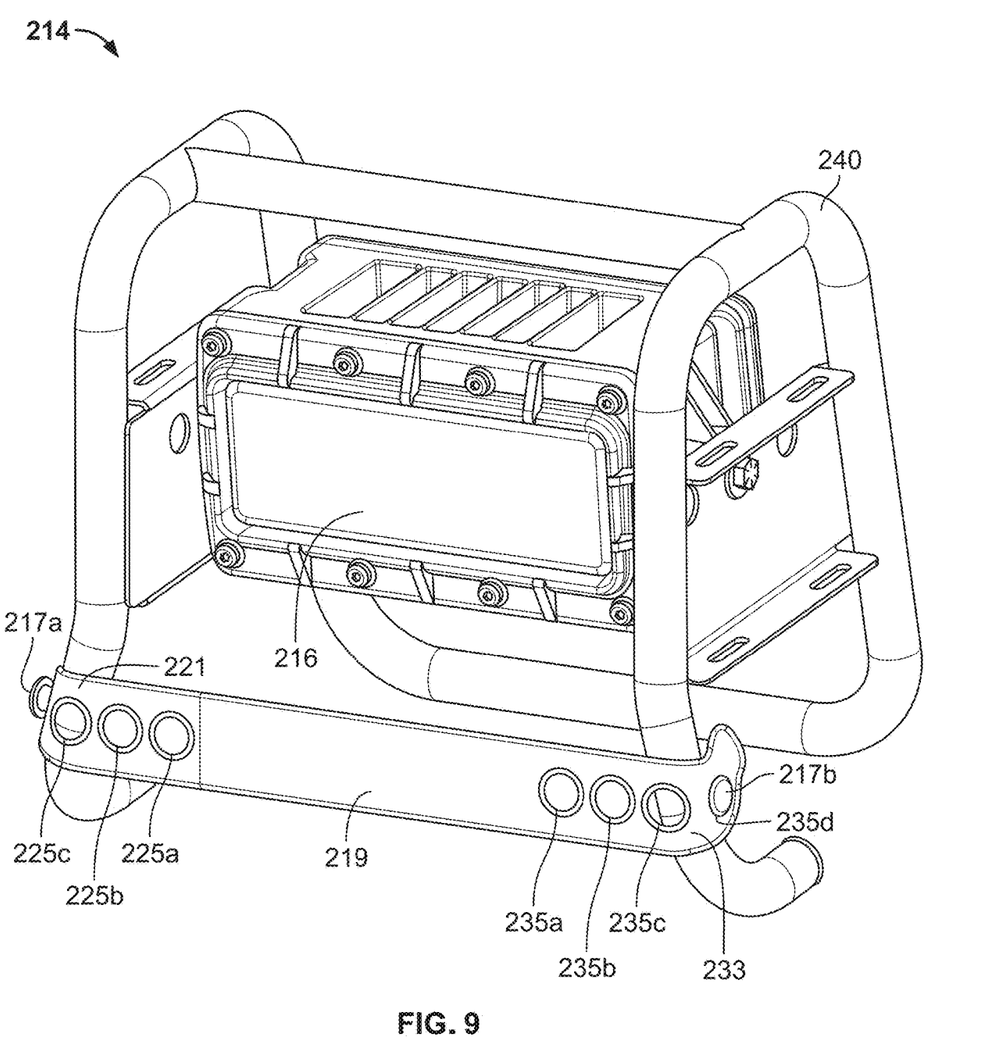
FIG. 9 is a front perspective view of an alternate embodiment of a portable lighting device according to the present disclosure.
Figure 10:
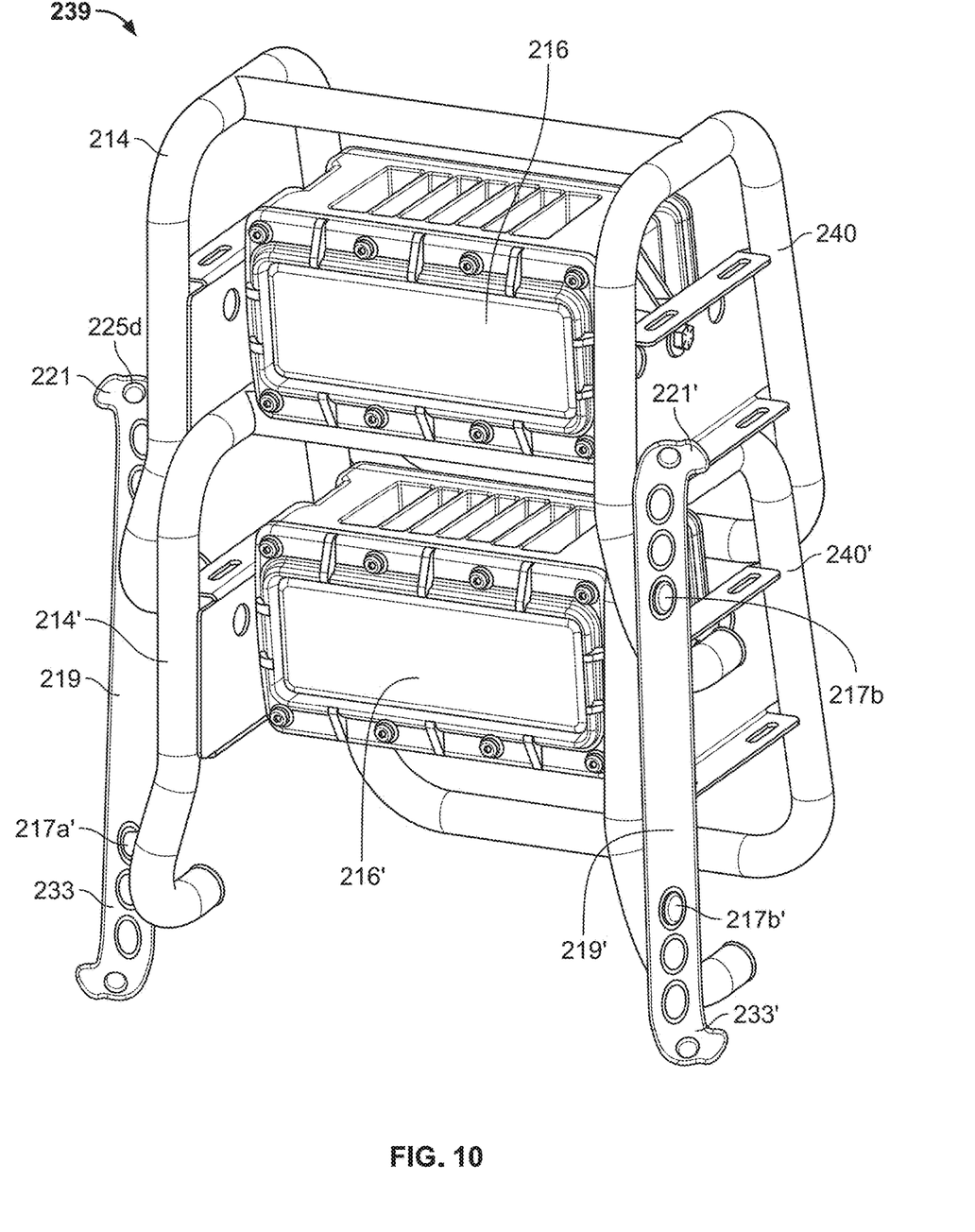
FIG. 10 is a front perspective view of a light array comprising two individual units of the portable lighting device of FIG. 9 in a stacked configuration.

FIG. 9 shows a second embodiment of a scene light 214 according to the present disclosure, and FIG. 10 shows a second embodiment of a light array 239 that includes multiple units of the scene light 214,214'. It should be understood that light 214' is identical to light 214 and that all reference numbers appearing in the specification and drawings that refer to one of the units of the light 214,214' refer also to identical parts bearing reference numbers of the same numerical value in the other of the units of the light 214,214', without the need to repeat explanations regarding the structure or functionality of each unit. Except as otherwise noted below, it should be further understood that the light 214 of the second embodiment is identical to the light 14 of the first embodiment in structure and functionality, and that all parts of the light 214 that are labeled with a reference number having a value that is 200 greater than the value of a part labeled with respect to the light 14 refer to identical parts (e.g., light head 216 is identical to light head 16).

In this embodiment, each of the lights 214,214' includes a respective pair of posts 217*a*,217*b* and 217*a'*,217*b'* that are welded to the respective frame 240,240' and is provided with a respective strap 219,219'. In this embodiment, the strap 219 is made of a durable but flexible material, e.g., rubber, leather, or a woven or non-woven fabric material. Each of the straps 219,219' includes a respective first end 221,221' having multiple post holes 225*a*-225*d*, 225*a'*-225*d'* and a respective second end 233,233' having multiple post holes 235*a*-235*d*, 235*a'*-235*d'*. As shown in FIG. 9, when a single unit of the light 214 is used alone, the strap 219 can be attached between the posts 217*a*,217*b* and used to help support the light 214 from a mounting item. The strap 219 could also be used to wrap around exterior objects (e.g., mounting objects, such as irregularly-shaped items like tree branches) to support the light 214 therefrom.

When multiple units of this embodiment of the light 214,214' are stacked together to form a light array 239, as shown in FIG. 10, the straps 219,219' can instead be attached between the vertically-aligned posts 217*a*,217*a'* and 217*b*, 217*b'* of the vertically adjacent lights 214,214' to securely hold the light array 239 together. The various post holes 225*a*-225*d*,225*a'*-225*d'*,235*a*-235*d*,235*a'*-235*d'* allow the user flexibility in how tightly the straps 219,219' are mounted between different lights 214,214' and other flexibility in terms of how the straps 219,219' are mounted.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. A lighting device comprising:
   at least one light; and
   a frame, the at least one light attached to the frame, the frame comprising
   a first bar portion and a second bar portion that comprise the top edges of the frame, the top edges of the frame lying in a first plane,
   a plurality of bottom edges, the plurality of bottom edges lying in a second plane, the first plane and the second plane being approximately parallel;
   a first side plate having a first body portion that is oriented approximately perpendicular to each of the first plane and the second plane and a first planar portion that extends via a first bend from the first body portion, the first planar portion being vertically aligned below the first bar portion between the first plane and the second plane, the first planar portion being oriented approximately parallel to the first bar portion and the first plane and lying in a third plane that is approximately parallel to the first plane;
   a second side plate having a second body portion that is oriented approximately perpendicular to each of the first plane and the second plane and a second planar portion that extends via a second bend from the second body portion, the second planar portion being vertically aligned below the second bar portion between the first plane and the second plane, the second planar portion being oriented approximately parallel to the second bar portion and the first plane and lying in the third plane, the first planar portion of the first side plate extending from the first body portion in a direction opposite a direction in which the second planar portion extends from the second body portion;

a first leg that extends from the first bar portion towards a front side of the frame and towards the second plane;

a second leg that extends from the second bar portion towards the front side of the frame and towards the second plane;

a third leg that extends from the first bar portion towards a rear side of the frame and towards the second plane; and a fourth leg that extends from the second bar portion towards the rear side of the frame and towards the second plane, the first side plate being attached between the first leg and the third leg and the second side plate being attached between the second leg and the fourth leg.

2. The lighting device of claim 1, wherein each of the first leg and the third leg connect with the first bar portion at locations above the at least one light and wherein each of the second leg and the fourth leg connect with the second bar portion at locations above the at least one light.

3. The lighting device of claim 1, wherein the first leg and the second leg are connected together and the third leg and the fourth leg are not connected together.

4. The lighting device of claim 3, wherein each of the third leg and the fourth leg include hooked portions.

5. The lighting device of claim 4, wherein each of the hooked portions is bent outwardly such that a width measured between respective interior edges of the two hooked portions is greater than a width measured between respective exterior edges of the third leg and the fourth leg when the two widths are measured along approximately parallel axes.

6. The lighting device of claim 1, wherein each of the third leg and the fourth leg include hooked portions.

7. The lighting device of claim 6, wherein each of the hooked portions is bent outwardly such that a width measured between respective interior edges of the two hooked portions is greater than a width measured between respective exterior edges of the third leg and the fourth leg when the two widths are measured along approximately parallel axes.

8. The lighting device of claim 1, wherein the front and rear sides of the frame are located on opposite sides of the at least one light.

9. The lighting device of claim 1, further comprising a cross-bar extending between the first bar portion and the second bar portion, the cross-bar being oriented approximately perpendicular to each of the first bar portion and the second bar portion.

10. The lighting device of claim 1, wherein the at least one light is attached between the first side plate and the second side plate.

11. The lighting device of claim 10, wherein the at least one light is rotatably attached to the first side plate and the second side plate such that the at least one light may be selectively aimed towards the front side of the frame or the rear side of the frame.

12. A lighting device comprising:

at least one light that is capable of being selectively aimed in a first direction and a second direction that is opposite the first direction; and a frame, the at least one light attached to the frame, the frame including a first bar portion and a second bar portion, the first bar portion and the second bar portion being located at a top portion of the frame located above the at least one light, a continuous frame portion that extends from both of the first bar portion and the second bar portion towards a first side of the frame that corresponds with the first direction of the at least one light, at least a portion of the continuous frame portion extending below the at least one light, a first frame portion extending from the first bar portion towards a second side of the frame that corresponds with the second direction of the at least one light, at least a portion of the first frame portion extending below the at least one light, the first frame portion having no additional connection with any other portion of the frame, and a second frame portion extending from the second bar portion towards the second side of the frame, at least a portion of the second frame portion extending below the at least one light, the second frame portion having no additional connection with any other portion of the frame.

13. The lighting device of claim 12, the continuous frame portion comprising a first leg that extends from the first bar portion, a second leg that extends from the second bar portion, and a cross portion extending between the first and second legs.

14. The lighting device of claim 13, the first frame portion comprising a third leg that extends from the first bar portion and a first hooked portion extending from the third leg, and the second frame portion comprising a fourth leg that extends from the second bar portion and a second hooked portion extending from the fourth leg.

15. The lighting device of claim 14, wherein each of the first hooked portion and the second hooked portion is bent outwardly such that a width measured between respective interior edges of the two hooked portions is greater than a width measured between respective exterior edges of the third leg and the fourth leg when the two widths are measured along approximately parallel axes.

16. The lighting device of claim 12, the first frame portion comprising a first leg that extends from the first bar portion and a first hooked portion extending from the first leg, and the second frame portion comprising a second leg that extends from the second bar portion and a second hooked portion extending from the second leg.

17. The lighting device of claim 16, wherein each of the first hooked portion and the second hooked portion is bent outwardly such that a width measured between respective interior edges of the two hooked portions is greater than a width measured between respective exterior edges of the first leg and the second leg when the two widths are measured along approximately parallel axes.

18. The lighting device of claim 12, the frame further comprising a first side plate and a second side plate, the first side plate being connected between the continuous frame portion and the first frame portion and the second side plate being connected between the continuous frame portion and the second frame portion, wherein the at least one light is attached between the first side plate and the second side plate.

19. The lighting device of claim 12, wherein the at least one light is rotatably attached to the frame.

20. An apparatus comprising:
a first unit and a second unit of a lighting device, the first and second units each having at least one light including a respective rotational range about a respective axis of rotation, the first and second units being stackable with the first unit located on top of the second unit or the second unit located on top of the first unit such that a light array having an upper unit and a lower unit is formed, each of the first and second units further comprising an identical frame, the frame comprising
top edges that lie in a first plane,
bottom edges that line in a second plane, the first and second planes being approximately parallel,
at least one planar portion lying in a third plane, the third plane being approximately parallel with the first plane, wherein in the light array the first plane of the lower unit is located above the second plane and adjacent to the third plane of the upper unit, and
wherein in the light array the at least one light of the upper unit is free to rotate through its entire rotational range and the at least one light of the lower unit is free to rotate through its entire rotational range without the lights contacting each other.

21. The apparatus of claim 20, each frame further comprising:
a first side plate having a first body portion that is oriented approximately perpendicular to each of the first plane and the second plane, the at least one planar portion comprising a first planar portion of the first side plate that extends approximately perpendicular from the first body portion the first side plate.

22. The apparatus of claim 21, each frame further comprising:
a second side plate having a second body portion that is oriented approximately perpendicular to each of the first plane and the second plane, the at least one planar portion further comprising a second planar portion of the second side plate that extends approximately perpendicular from the second body portion the second side plate,
wherein the at least one light is attached between the first side plate and the second side plate.

* * * * *